(12) United States Patent
Solodovnik et al.

(10) Patent No.: US 10,784,701 B2
(45) Date of Patent: Sep. 22, 2020

(54) POWER SYSTEM ARCHITECTURE FOR AIRCRAFT WITH ELECTRICAL ACTUATION

(71) Applicant: The Boeing Company, Chicago, IL (US)

(72) Inventors: Eugene V. Solodovnik, Kenmore, WA (US); Thomas F. Currier, Lynnwood, WA (US); Mark E. Liffring, Seattle, WA (US); Kamiar J. Karimi, Kirkland, WA (US)

(73) Assignee: THE BOEING COMPANY, Chicago, IL (US)

( * ) Notice: Subject to any disclaimer, the term of this patent is extended or adjusted under 35 U.S.C. 154(b) by 173 days.

(21) Appl. No.: 15/834,606

(22) Filed: Dec. 7, 2017

(65) Prior Publication Data

US 2019/0181669 A1 Jun. 13, 2019

(51) Int. Cl.
*H02J 7/00* (2006.01)
*H02J 9/06* (2006.01)
*B64C 13/50* (2006.01)
*H02J 7/14* (2006.01)
*B64D 41/00* (2006.01)
(Continued)

(52) U.S. Cl.
CPC ............ *H02J 7/0068* (2013.01); *B64C 13/50* (2013.01); *B64D 41/00* (2013.01); *H02J 5/00* (2013.01); *H02J 7/1415* (2013.01); *H02J 7/1423* (2013.01); *H02J 7/1438* (2013.01); *H02J 7/1469* (2013.01); *H02J 7/34* (2013.01); *H02J 9/06* (2013.01); *H02J 7/143* (2020.01)

(58) Field of Classification Search
CPC ........ H02J 7/0068; H02J 25/00; H02J 7/1423; H02J 7/1415; H02J 7/1438; H02J 7/1469; H02J 7/34; H02J 9/06; H02J 2007/143; B64D 41/00; B64C 13/50

See application file for complete search history.

(56) References Cited

U.S. PATENT DOCUMENTS

| 2004/0119454 A1* | 6/2004 | Chang ................ H02J 4/00 323/284 |
| 2009/0302153 A1* | 12/2009 | Matasso ............... H02J 1/10 244/99.2 |

(Continued)

FOREIGN PATENT DOCUMENTS

| EP | 2719572 A1 | 4/2014 |
| FR | 2911442 A1 | 7/2008 |
| WO | WO2014022316 A1 | 2/2014 |

OTHER PUBLICATIONS

European Patent Office; Extended European Search Report; European Patent Application No. 18210020.6 dated May 7, 2019.

*Primary Examiner* — Jared Fureman
*Assistant Examiner* — Emmanuel Dominique
(74) *Attorney, Agent, or Firm* — Parsons Behle & Latimer

(57) ABSTRACT

An electrical power system for regenerative loads may include a DC bus and an electrical actuator load, where back-driving the electrical actuator load generates regenerative electrical energy, and where the electrical actuator load is configured to transmit the regenerative electrical energy to the DC bus. The system may also include at least one additional load, where at least a portion of the regenerative electrical energy is transmitted to the at least one additional load.

20 Claims, 4 Drawing Sheets

(51) Int. Cl.
  *H02J 5/00*   (2016.01)
  *H02J 7/34*   (2006.01)

(56) References Cited

U.S. PATENT DOCUMENTS

| | | | |
|---|---|---|---|
| 2013/0049657 A1* | 2/2013 | Rozman | B60L 50/51 |
| | | | 318/400.3 |
| 2013/0234675 A1* | 9/2013 | King | H02J 7/1492 |
| | | | 320/163 |
| 2013/0241485 A1* | 9/2013 | Snyder | B60L 58/15 |
| | | | 320/109 |
| 2015/0183385 A1* | 7/2015 | Iwashima | B60L 53/00 |
| | | | 307/9.1 |
| 2016/0070266 A1 | 3/2016 | Divito | |
| 2016/0318503 A1* | 11/2016 | Zhou | B60W 20/13 |
| 2018/0362181 A1* | 12/2018 | Iwashima | H02M 7/12 |

\* cited by examiner

POWER SYSTEM ARCHITECTURE FOR AIRCRAFT WITH ELECTRICAL ACTUATION

FIELD OF THE DISCLOSURE

This disclosure related generally to a power system architecture and, in particular, a power system architecture for aircraft with electrical actuation.

BACKGROUND

Traditional flight control actuation systems employ high pressure hydraulic fluid to provide power to actuators that move airplane control surfaces. The installation of hydraulic systems may be expensive and time consuming and may include significant adjustments (rigging) during the process. In contrast, electrical actuators may not require expensive rigging, testing, or bleeding of air from hydraulic lines. In electrical actuation systems, hydraulic tubing is replaced with electrical wires, which are lighter, occupy less volume, and are easier to integrate into tight spaces. Also, the installation of electrical actuators may be relatively simple and inexpensive.

Electrical actuators may regenerate electrical power when a flight control surface attached to the actuator is back-driven by the force of air during flight. An actuator motor is typically a permanent magnet motor, which, if back-driven, acts as a generator to produce regenerative electrical energy. This energy may pass back to the actuator motor controller and to a direct current (DC) link attached thereto. Depending on an alternating current (AC)/DC rectifier topology, the regenerative electrical energy may also propagate into an AC system. If the AC/DC rectifier cannot propagate the regenerative electrical energy to the AC bus, then the excess energy may cause a voltage rise at the DC link that can damage the rectifier, the DC link, the electrical actuator, and/or other electrical components. If the AC/DC rectifier is able to propagate the excess energy to the AC bus, then a power factor of the load on an AC generator that provides power to the AC bus can shift from lagging to leading, effectively adding a capacitance to the generator. The added capacitance may reduce the power quality of the system and, in some cases, can lead to generator self-excitation and an uncontrollable rise of the voltage.

Some electrical actuator systems include one or more resistors to dissipate the excess regenerative electrical energy. A solid-state switch may be used to connect the resistor to the system when the voltage at the DC link reaches a threshold limit. The power consumed by the resistor results in energy losses that could be used by other systems of the aircraft. Further, the heat generated by the resistor can create thermal management issues, which may require additional heat sink devices. Often, additional airflow must also be directed to the actuators to allow the heat sink devices to sufficiently manage the additional heat generated. As such, the additional devices may add weight and drag to the aircraft resulting in a decrease in performance and an increase in fuel usage. The extra heat may also affect the reliability of the electrical actuators themselves. Other disadvantages may exist.

SUMMARY

Disclosed are systems and methods that may overcome at least one of the above-described disadvantages. For example, an electrical power system may include a DC bus to receive regenerative electrical energy from an electrical actuator load and to provide the regenerative electrical energy to one or more other loads (actuators, devices, systems, etc.) connected to the DC bus. The system may also include a battery to store the excess electrical energy.

In an embodiment, an electrical power system for regenerative loads includes a DC bus. The system further includes an electrical actuator load, where back-driving the electrical actuator load generates regenerative electrical energy, and where the electrical actuator load is configured to transmit the regenerative electrical energy to the DC bus. The system also includes at least one additional load, where at least a portion of the regenerative electrical energy is transmitted to the at least one additional load.

In some embodiments, the system includes a battery charger, where at least a portion of the regenerative electrical energy is transmitted to the battery charger, and a battery configured to be charged by the battery charger. In some embodiments, the system includes an AC bus, and a rectifier configured to convert AC electrical energy from the AC bus into DC electrical energy and to transmit the DC electrical energy to the DC bus. In some embodiments, the system includes a bus power control unit configured to connect a battery charger to the DC bus in response to a battery having a state-of-charge that is less than a first threshold charge, and configured to disconnect a rectifier from the DC bus in response to the battery having a state-of-charge that is greater than a second threshold charge.

In some embodiments, the DC bus is a left DC bus of a vehicle, the system includes a right DC bus. In some embodiments, the left DC bus and the right DC bus are configured to transmit electrical energy between each other in response to a control signal from the bus power control unit. In some embodiments, the electrical actuator load is a left electrical actuator load of the vehicle, the system includes a right electrical actuator load, where back-driving the right electrical actuator load generates additional regenerative electrical energy, and where the right electrical actuator load is configured to transmit the additional regenerative electrical energy to the right DC bus. In some embodiments, the battery charger is a left battery charger and the battery is a left battery of the vehicle, and the system includes a right battery charger, where at least a portion of the additional regenerative electrical energy is transmitted to the right battery charger, and a right battery configured to be charged by the right battery charger.

In some embodiments, the electrical actuator load is configured to move a flight control surface of an aircraft. In some embodiments, the regenerative electrical energy is not dissipated as heat through a resistor coupled to the DC bus or the electrical actuator load.

In an embodiment, a method for managing regenerative loads in an electrical power system includes transmitting electrical energy from a DC bus to an electrical actuator coupled to the DC bus. The method further includes receiving, at the DC bus, regenerative electrical energy from the electrical actuator caused by the occurrence of back-driving the electrical actuator. The method also includes storing at least a portion of the regenerative electrical energy at a battery coupled to the DC bus.

In some embodiments, the method includes transmitting at least a portion of the regenerative electrical energy to at least one load coupled to the DC bus. In some embodiments, the method includes converting AC electrical energy from an AC bus into DC electrical energy and receiving the DC electrical energy at the DC bus. In some embodiments, the method includes connecting a battery charger to the DC bus in response to the battery having a state-of-charge that is less than a first threshold charge, and disconnecting a rectifier from an AC bus in response to the battery having a state-of-charge that is greater than a second threshold charge.

In some embodiments, the DC bus is a left DC bus of a vehicle, and the method includes transmitting electrical energy between the left DC bus and a right DC bus. In some embodiments, the method includes moving a flight control surface using the electrical actuator. In some embodiments, the method is performed without dissipating the regenerative electrical energy as heat through a resistor coupled to the DC bus or the electrical actuator.

In an embodiment, a method for managing regenerative loads in an electrical power system includes, in response to a battery having a state-of-charge that is less than a first threshold charge, selectively coupling the battery to a DC bus to charge the battery. The method further includes in response to the battery having a state-of-charge greater than a second threshold charge, selectively decoupling a rectifier unit from an AC bus. The method also includes receiving regenerative electrical energy at the DC bus caused by the occurrence of back-driving an electrical actuator coupled to the DC bus.

In some embodiments, the method includes, in response to a power source interruption at an AC bus, disconnecting a battery charger from the DC bus, and connecting a battery to the DC bus. In some embodiments, the method includes, in response to restoration of the power source at the AC bus, disconnecting the battery from the DC bus, and connecting the battery charger to the DC bus.

Figure 1:
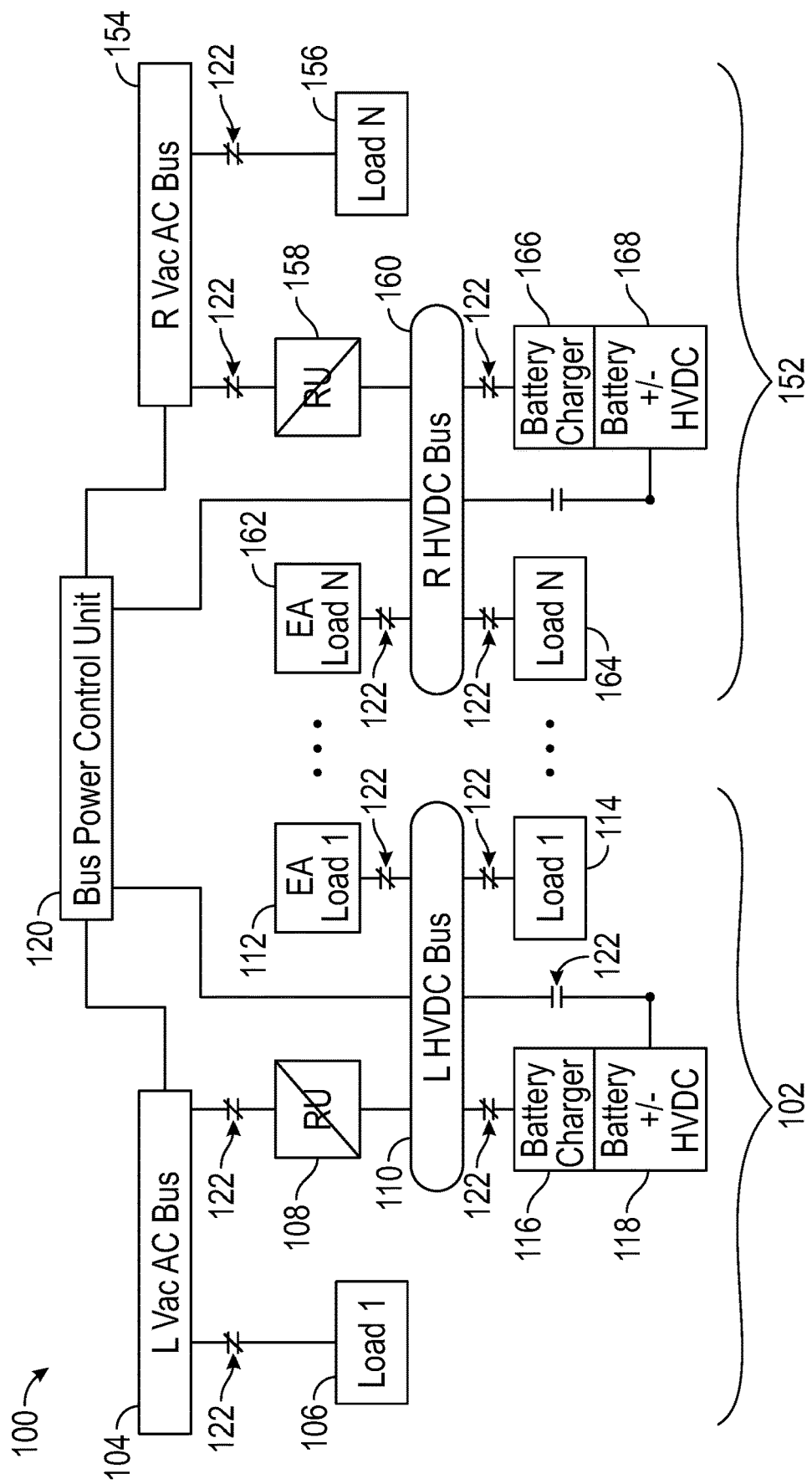
FIG. 1 is a block diagram depicting an embodiment of an electrical power system for regenerative loads.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, an embodiment of an electrical power system 100 for regenerative loads is depicted. The system 100 may be part of a vehicle, such as an aircraft. Further, the vehicle may have symmetrical features on its left and right sides. This symmetry may be carried through to the electrical power system 100. As such, the system 100 may include a left sub-system 102 corresponding to a left side of a vehicle (e.g., an aircraft) and a right sub-system 152 corresponding to a right side of the vehicle.

The left sub-system 102 may include a left AC bus 104. The left AC bus 104 may be powered by a turbine powered generator (not shown), an external power source, another type of generator, or any combination thereof. At least one left AC load 106 may be connected to and powered by the left AC bus 104. The left AC load 106 may correspond to an AC electronic device, or another type of AC load.

The left sub-system 102 may further include a rectifier 108 that converts AC electrical energy from the AC bus 104 into DC electrical energy. The rectifier 108 may include any circuit topology usable to convert the AC electrical signal present on the left AC bus 104. Some examples of rectifier topologies that may be implemented in the system 100 include passive rectifiers, such as, but not limited to, auto-transformer rectifier units, and active rectifiers, such as, but not limited to, boost or buck power factor correction rectifiers.

The DC electrical power converted by the rectifier 108 may be transmitted to a left DC bus 110. The voltage on the left DC bus 110 may fluctuate from time to time, increasing as electrical energy is transmitted to the left DC bus 110 and decreasing as it re-approaches an equilibrium. To compensate for these power fluctuations, each system or device connected to the DC bus 110 may have a motor controller (not shown) or other type of controller that regulates the actual DC voltage supplied. The left DC bus 110 may be a high voltage DC bus, having voltage levels of +/−135 volts or +/−270 volts for aircraft applications.

The left DC bus 110 may supply power to one or more left regenerative load 112. For example, the left regenerative load 112 may be an electrical actuator coupled to a flight control surface of an aircraft, such as an aileron, an elevator, a rudder, a flap, a spoiler, slats, air brakes, or another type of control surface. During use, the regenerative load 112 may generate regenerative electrical energy. For example, the regenerative load 112 may include a permanent magnet motor that, when back-driven, generates electrical energy. The regenerative load 112 may be coupled to the control surface, or another surface of an aircraft that is subject to external forces. The external forces may drive the surface back, thereby back-driving the motor and generating the regenerative electrical energy.

Additionally, the DC bus 110 may supply power to one or more left non-regenerative loads 114. The non-regenerative loads 114 may include loads that are not typically back-driven by external forces, such as landing gear, internal motors, and electronic devices.

The left sub-system 102 may also include a left battery charger 116 configured to charge a left battery 118. The battery may be a high voltage DC battery, having a voltage capacity of +/−135 volts or +/−270 volts for aircraft applications.

As with the left sub-system 102, the right sub-system 152 may include a right AC bus 154, a right AC load 156, a right rectifier 158, a right DC bus 160, at least one right regenerative load 162, at least one right non-regenerative load 164, a right battery charger 166, and a right battery 168. These features of the right sub-system 152 may have the same attributes and configurations as their counterparts from the left sub-system 102.

Some features of the left sub-system 102 and the right sub-system 152 may interact with each other. For example, it may be possible to transfer electrical energy between the left DC bus 110 and the right DC bus 160. Other interactions are possible.

The system 100 may further include one or more bus power control unit 120. The bus power control unit 120 may be communicatively coupled to the AC buses 104, 154 and the DC buses 110, 160. More particularly, the bus power control unit 120 may control a plurality of contactors 122 to switch each of the components of the sub-systems 102, 152 in and out of the system 100. For example, the left AC load 106 may be connected and disconnected from the left AC bus 104. The left rectifier 108 may be connected and disconnected from the left AC bus 104. The left regenerative load 112, the non-regenerative load 114, the battery charger 116, and the battery 118 may be individually connected and disconnected from the left DC bus 110. The left DC bus 110 and the right DC bus 160 may be connected and disconnected to perform a power transfer operation. Similar, connections and disconnections between the components of the right sub-system 152 may also be controlled by the bus power control unit 120.

The bus power control unit 120 may include a microprocessor or another type of controller unit. For example, the bus power control unit 120 may include a central processing unit (CPU), a graphical processing unit (GPU), a digital signal processor (DSP), a peripheral interface controller (PIC), another type of microprocessor, or combinations thereof. It may be implemented as an integrated circuit, a field programmable gate array (FPGA), an application specific integrated circuit (ASIC), a combination of logic gate circuitry, other types of digital or analog electrical design components, or combinations thereof. The bus power control unit 120 may further include various sensors. For example, voltage sensors may detect the voltage on the AC buses 104, 154, the DC buses 110, 160, and the batteries 118, 168. This data may be used by the bus power control unit 120 to determine how to manage power within the system 100.

During operation, the left AC bus 104 may provide AC electrical energy to the left load 106 and to the left rectifier 108. The left rectifier 108 may convert the AC electrical energy into DC electrical energy and transmit the DC electrical energy to the left DC bus 110. The left DC bus 110 may provide the DC electrical energy to the regenerative load 112, the non-regenerative load 114, and the battery charger 116.

As some point, the regenerative load 112 may be back-driven, resulting in regenerative electrical energy being transmitted to the left DC bus 110. The regenerative electrical energy may be transmitted to the left non-regenerative load 114 when the non-regenerative load 114 is coupled to the left DC bus 110. Otherwise, the regenerative electrical energy may be transmitted to the battery charger 116 and used to charge the battery 118. The same operations may occur relative to the right sub-system 152.

A benefit of the system 100 is that by receiving the regenerative electrical energy on the DC buses 110, 160, it may be used to subsequently power other loads, such as the non-regenerative loads 114, 164. Another benefit is that, by including the battery 118, 168 the regenerative energy may be stored until a later time. This may enable the system 100 to omit a discharge resistor at the regenerative DC loads 112, 162 or at the DC buses 110, 160. Other advantages may exist.

Figure 2:
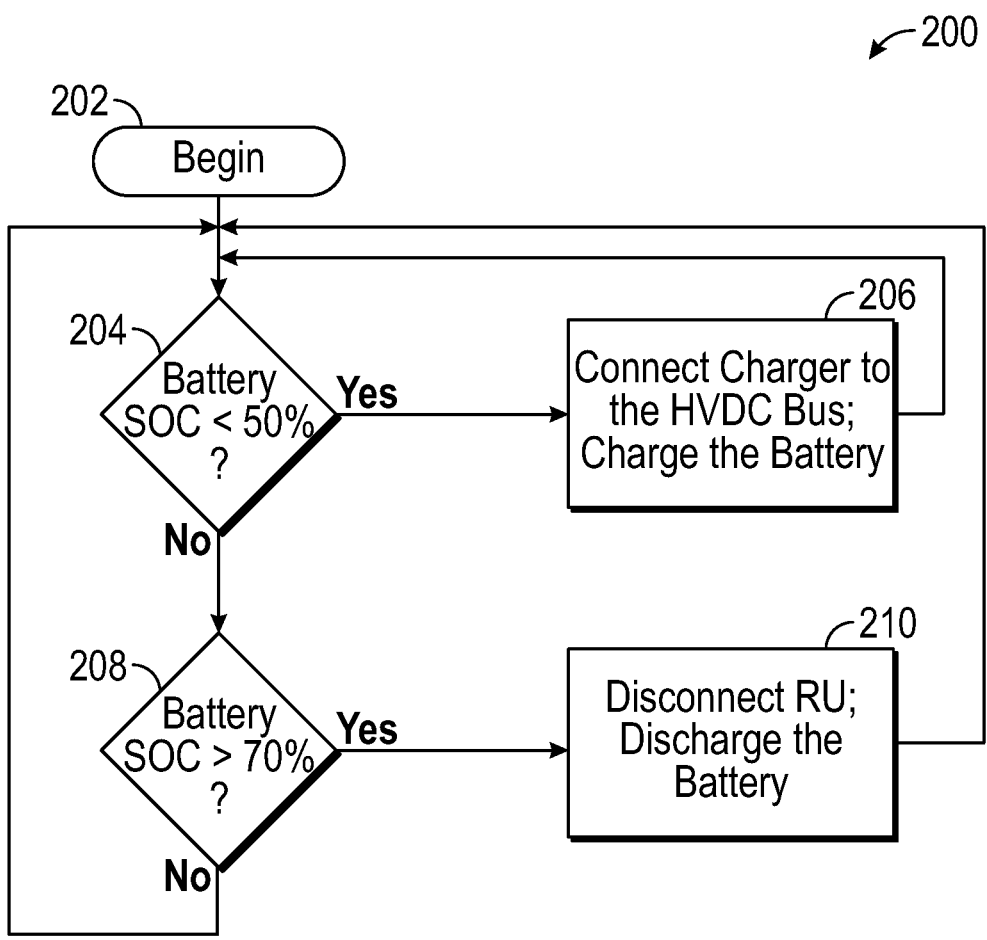
FIG. 2 is a flow diagram depicting an embodiment of a method for managing regenerative loads.

Referring to FIG. 2, an embodiment of a method 200 for managing regenerative loads is depicted. The method 200 may be implemented by the bus power control unit 120 in order to keep a state-of-charge at the batteries 118, 168 at a level that permits the batteries 118, 168 to accept additional charge from the regenerative electrical energy received from the regenerative loads 112, 162. While the methods are described with reference to the left subsystem 102, it should be understood that the same methods may be applied with respect to the right sub-system 152.

The method 200 may begin at 202 and may include determining whether a battery state-of-charge is less than a first threshold, at 204. For example, the bus power control unit 120 may determine whether a state-of-charge of the left DC battery 118 is less than a first threshold. In an embodiment, the first threshold may be 50%. However, other threshold values may be used.

The method 200 may further include, in response to the state-of-charge being less than 50%, connecting a battery charger to a DC bus, such as a high voltage direct current (HVDC) bus, and thereby charging the battery, at 206. For example, the left battery charger 116 may be connected to the left DC bus 110 via one of the contactors 122 under control of the bus power control unit 120. This may result in the left battery 118 being charged.

The method 200 may also include determining whether a battery state-of-charge is greater than a second threshold, at 208. For example, the bus power control unit 120 may determine whether a state-of-charge of the left DC battery 118 is greater than a second threshold. The second threshold value should be sufficient to leave enough charging capacity in the battery 118 to receive regenerative energy from the left DC bus 110. In an embodiment, the second threshold is 70%. However, other threshold values may be used.

The method 200 may include, in response to the state-of-charge being greater than the second threshold, disconnecting a rectifier, rectifier unit (RU), from an AC bus, and thereby discharging (e.g., powering devices from) the battery, at 210. For example, when the state-of-charge of the left battery 118 exceeds the second threshold, the rectifier 108 may be disconnected from the left AC bus 104. The left battery 118 may then be used to power the left DC bus, resulting in the discharge of the battery 118.

A benefit of the method 200 is that a state-of-charge of the batteries 118, 168, may be maintained at a low enough level to accept additional regenerative energy received from their respective regenerative loads 112, 162. Other advantages may exist.

Figure 3:
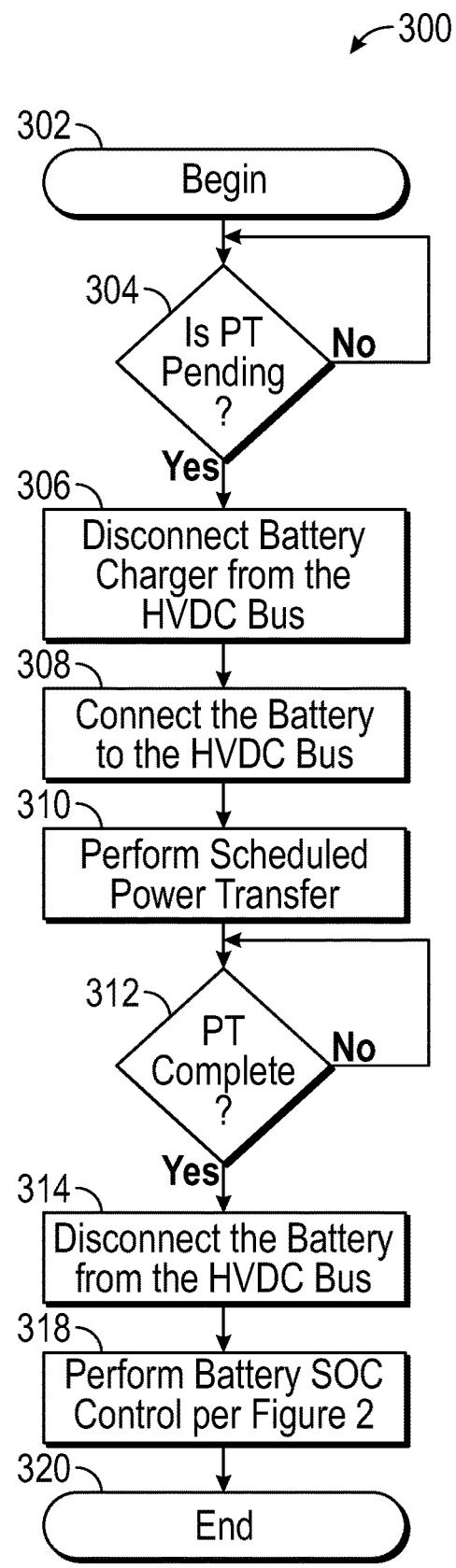
FIG. 3 is a flow diagram depicting an embodiment of managing a power source interruption at an electrical power system for regenerative loads.

Referring to FIG. 3, an embodiment of a method 300 of managing a power source interruption at an electrical power system for regenerative loads is depicted.

The method 300 begins at 302 and may include determining whether a power transfer is pending, at 304. A power transfer may cause in interruption of power. Although a power transfer is used as the cause for an interruption of power in the example of FIG. 3, other reasons for power interruption may also be detected.

The method 300 may further include, in response to determining that a power interruption is going to occur, disconnecting a battery charger from a DC bus, at 306. For example, the left battery charger 116 may be disconnected from the left DC bus 110 using one of the contactors 122 under control of the bus power control unit 120. Likewise, the right battery charger 166 may be disconnected from the right DC bus 160.

The method 300 may also include connecting the battery to the DC bus, at 308. For example, the left battery 118 may be connected to, and used to power, the left DC bus 110. The right battery 168 may be connected to, and used to power, the right DC bus 160.

The method 300 includes performing the power transfer, at 310, and determining whether the power transfer is complete, at 312. As explained above, a power transfer is only one example of a cause for power interruption. Other power interruptions may occur. In some embodiments, the method 300 may include waiting for the end of a power source interruption, regardless of the cause.

The method 300 may include, in response to the power transfer being complete, or another type of power interruption ending, disconnecting the battery from the DC bus, at 314. For example, the left battery 118 may be disconnected from the left DC bus 110. The right battery 168 may be disconnected from the right DC bus 160. The method 300 may include performing the method 200 of FIG. 2, which may include reconnecting the battery charger to the DC bus, at 318, after which, the method 300 may end, at 320.

A benefit of the method 300 is that the batteries 118, 168 may be used to provide uninterrupted power to the DC buses 110, 160 during power events that might otherwise create a power interruption. Other advantages may exist.

Figure 4:
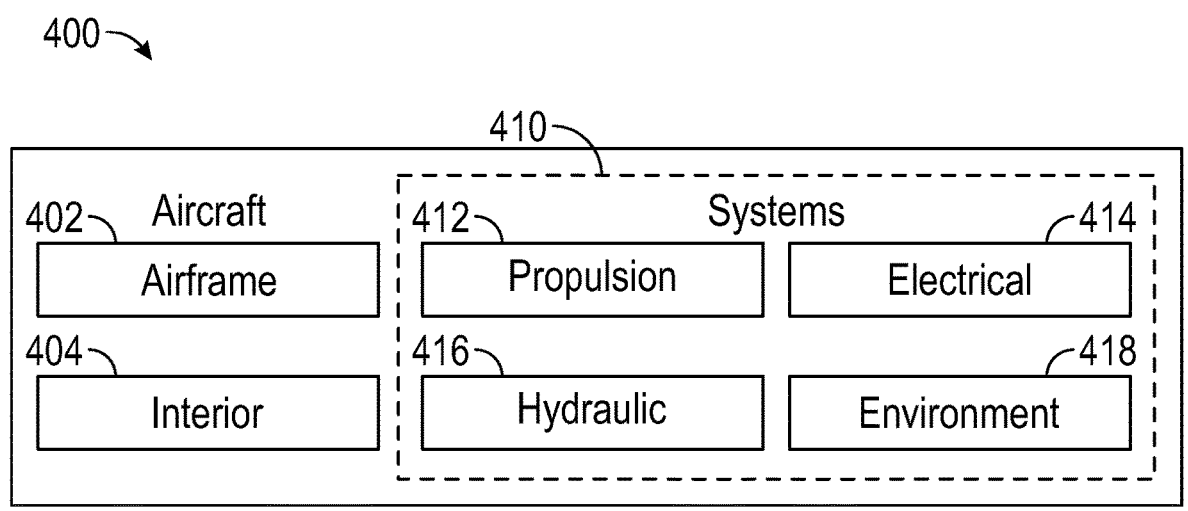
FIG. 4 is a block diagram depicting an embodiment of an aircraft including multiple structures and systems.

Referring to FIG. 4, an embodiment of an aircraft 400 is depicted. The aircraft 400 may include an airframe 402, an interior 404, and a plurality of systems 410. Examples of high-level systems 410 include one or more of a propulsion system 412, an electrical system 414, a hydraulic system 416, and an environmental system 418. Any number of other systems may be included. Although an aerospace example is shown, the principles of the disclosure may be applied to other industries, such as the automotive industry.

As described herein, portions of the hydraulic system 416 may be replaced by electrical actuators, and may, therefore, be included as part of the electrical system 414. For example, the electrical system 414 may include the electrical power system 100 for regenerative loads described herein.

Although various embodiments have been shown and described, the present disclosure is not so limited and will be understood to include all such modifications and variations as would be apparent to one skilled in the art.

What is claimed is:

1. An electrical power system for regenerative loads comprising:
   a direct current (DC) bus;
   an electrical actuator load, wherein back-driving the electrical actuator load generates regenerative electrical energy, and wherein the electrical actuator load is configured to transmit the regenerative electrical energy to the DC bus;
   at least one additional load, wherein at least a portion of the regenerative electrical energy is transmitted to the at least one additional load;
   an alternating current (AC) bus;
   a rectifier configured to convert AC electrical energy from the AC bus into DC electrical energy and to transmit the DC electrical energy to the DC bus; and
   a bus power control unit that connects a battery charger to the DC bus in response to a battery having a state-of-charge that is less than a first threshold charge, and that disconnects the rectifier from the AC bus in response to the battery having a state-of-charge that is greater than a second threshold charge.

2. The system of claim 1, wherein at least a portion of the regenerative electrical energy is transmitted to the battery charger, and wherein the battery is configured to be charged by the battery charger.

3. The system of claim 1, wherein the DC bus is a left DC bus of a vehicle, the system further comprising:
   a right DC bus.

4. The system of claim 3, wherein the left DC bus and the right DC bus are configured to transmit electrical energy between each other in response to a control signal from the bus power control unit.

5. The system of claim 3, wherein the electrical actuator load is a left electrical actuator load of the vehicle, the system further comprising:
   a right electrical actuator load, wherein back-driving the right electrical actuator load generates additional regenerative electrical energy, and wherein the right electrical actuator load is configured to transmit the additional regenerative electrical energy to the right DC bus.

6. The system of claim 5, wherein the battery charger is a left battery charger and the battery is a left battery of the vehicle, the system further comprising:
   a right battery charger, wherein at least a portion of the additional regenerative electrical energy is transmitted to the right battery charger; and
   a right battery configured to be charged by the right battery charger.

7. The system of claim 1, wherein the electrical actuator load is configured to move a flight control surface of an aircraft.

8. The system of claim 1, wherein the regenerative electrical energy is not dissipated as heat through a resistor coupled to the DC bus or the electrical actuator load.

9. The system of claim 1, wherein the first threshold charge is 50 percent.

10. The system of claim 1, wherein the second threshold charge is 70 percent.

11. A method for managing regenerative loads in an electrical power system, the method comprising:
    transmitting electrical energy from a direct current (DC) bus to an electrical actuator coupled to the DC bus;
    receiving, at the DC bus, regenerative electrical energy from the electrical actuator caused by the occurrence of back-driving the electrical actuator;
    storing at least a portion of the regenerative electrical energy at a battery coupled to the DC bus;
    connecting a battery charger to the DC bus in response to the battery having a state-of-charge that is less than a first threshold charge; and
    disconnecting a rectifier from an AC bus in response to the battery having a state-of-charge that is greater than a second threshold charge.

12. The method of claim 11, further comprising:
    transmitting at least a portion of the regenerative electrical energy to at least one load coupled to the DC bus.

13. The method of claim 11, further comprising:
    converting alternating current (AC) electrical energy from the AC bus into DC electrical energy and receiving the DC electrical energy at the DC bus.

14. The method of claim 11, wherein the DC bus is a left DC bus of a vehicle, the method further comprising:
    transmitting electrical energy between the left DC bus and a right DC bus.

15. The method of claim 11, further comprising:
    moving a flight control surface using the electrical actuator.

16. The method of claim 11, wherein the method is performed without dissipating the regenerative electrical energy as heat through a resistor coupled to the DC bus or the electrical actuator.

17. A method for managing regenerative loads in an electrical power system, the method comprising:
    in response to a battery having a state-of-charge that is less than a first threshold charge, selectively coupling the battery to a direct current (DC) bus to charge the battery;
    in response to the battery having a state-of-charge greater than a second threshold charge, selectively decoupling a rectifier unit from an alternating current (AC) bus; and
    receiving regenerative electrical energy at the DC bus caused by the occurrence of back-driving an electrical actuator coupled to the DC bus.

18. The method of claim 17, further comprising:
  in response to a power source interruption at the AC bus, disconnecting a battery charger from the DC bus; and
connecting a battery to the DC bus.

19. The method of claim 18, further comprising:
  in response to restoration of the power source interruption at the AC bus, disconnecting the battery from the DC bus; and
connecting the battery charger to the DC bus.

20. The method of claim 17, wherein the second threshold charge is 70 percent.

* * * * *